(12) United States Patent
Filipkowski

(10) Patent No.: US 10,675,943 B2
(45) Date of Patent: Jun. 9, 2020

(54) METHOD AND APPARATUS FOR ADAPTIVE HVAC CONTROL

(71) Applicant: NIO USA, Inc., San Jose, CA (US)

(72) Inventor: Matthew Filipkowski, Pleasanton, CA (US)

(73) Assignee: NIO USA, Inc., San Jose, CA (US)

( * ) Notice: Subject to any disclaimer, the term of this patent is extended or adjusted under 35 U.S.C. 154(b) by 141 days.

(21) Appl. No.: 15/584,441

(22) Filed: May 2, 2017

(65) Prior Publication Data

US 2018/0141408 A1 May 24, 2018

Related U.S. Application Data

(60) Provisional application No. 62/425,906, filed on Nov. 23, 2016.

(51) Int. Cl.
*B60H 1/00* (2006.01)

(52) U.S. Cl.
CPC ....... *B60H 1/00742* (2013.01); *B60H 1/0075* (2013.01); *B60H 1/00735* (2013.01); *B60H 1/00771* (2013.01); *B60H 1/00785* (2013.01); *B60H 1/00971* (2013.01)

(58) Field of Classification Search
USPC .............................. 165/237; 62/157, 211, 244
See application file for complete search history.

(56) References Cited

U.S. PATENT DOCUMENTS

| | | | | |
|---|---|---|---|---|
| 4,434,932 A * | 3/1984 | Hara | .................. | B60H 1/00842 165/43 |
| 6,488,213 B2 * | 12/2002 | Ohga | .................. | B60H 1/00828 165/247 |
| 9,202,316 B1 * | 12/2015 | Trudell | .............. | B60H 1/00978 |
| 2003/0127527 A1 * | 7/2003 | Ichishi et al. | ...... | B60H 1/00735 236/49.3 |
| 2003/0136854 A1 * | 7/2003 | Aoki | ..................... | B60H 1/0075 236/49.3 |
| 2004/0103675 A1 * | 6/2004 | Tomita | ............... | B60H 1/00735 62/157 |
| 2008/0073057 A1 * | 3/2008 | Kojima | .............. | B60H 1/00735 165/43 |
| 2008/0195564 A1 * | 8/2008 | Kojima | .............. | B60H 1/00735 706/12 |
| 2009/0150024 A1 * | 6/2009 | Kojima | .............. | B60H 1/00642 701/36 |
| 2014/0309790 A1 * | 10/2014 | Ricci | ....................... | H04W 4/21 700/276 |
| 2014/0309870 A1 * | 10/2014 | Ricci | ....................... | H04W 4/21 701/36 |
| 2015/0313475 A1 * | 11/2015 | Benson | ................ | A61B 5/6893 297/217.3 |

FOREIGN PATENT DOCUMENTS

JP 2000062431 A * 2/2000
WO WO-03041976 A1 * 5/2003 ........... B60H 1/0075

* cited by examiner

*Primary Examiner* — Tho V Duong
(74) *Attorney, Agent, or Firm* — Sheridan Ross P.C.

(57) ABSTRACT

A method and apparatus of adaptive climate control in a vehicle heating, ventilation, air conditioning (HVAC) system includes setting an initial climate condition for one or more zones in a vehicle passenger compartment based upon an occupant of the one or more zones. One or more inputs are monitored, and the climate conditions are changed for at least one of the one or more zones based upon the received one or more inputs. Data relating to the applied changed climate conditions for that occupant is stored.

20 Claims, 3 Drawing Sheets

METHOD AND APPARATUS FOR ADAPTIVE HVAC CONTROL

CROSS REFERENCE TO RELATED APPLICATIONS

This application claims the benefit of U.S. Provisional Application Ser. No. 62/425,906, filed on Nov. 23, 2016, the contents of which are incorporated by reference herein as if fully set forth.

FIELD OF INVENTION

The present invention relates to vehicle heating, ventilation, and air conditioning (HVAC) control, and, more particularly, to adaptive HVAC control in a vehicle based on occupant preferences and local conditions.

BACKGROUND

Vehicles that include an adjustable heating, ventilation, and air conditioning (HVAC) system provide the ability to alter the cabin conditions for occupants. Automotive automatic HVAC control systems have evolved steadily, but there have not been strides to provide adaptive HVAC control that responds and proactively adapts to specific occupants, such as a particular driver or passenger.

SUMMARY

A method of adaptive climate control in a vehicle heating, ventilation, air conditioning (HVAC) system is disclosed. The method includes setting an initial climate condition for one or more zones in a vehicle passenger compartment based upon an occupant of the one or more zones. One or more inputs are monitored, and the climate conditions are changed for at least one of the one or more zones based upon the received one or more inputs. Data relating to the applied changed climate conditions for that occupant is stored.

BRIEF DESCRIPTION OF THE DRAWINGS

A more detailed understanding can be had from the following description, given by way of example in conjunction with the accompanying drawings wherein.

DETAILED DESCRIPTION

Figure 1:
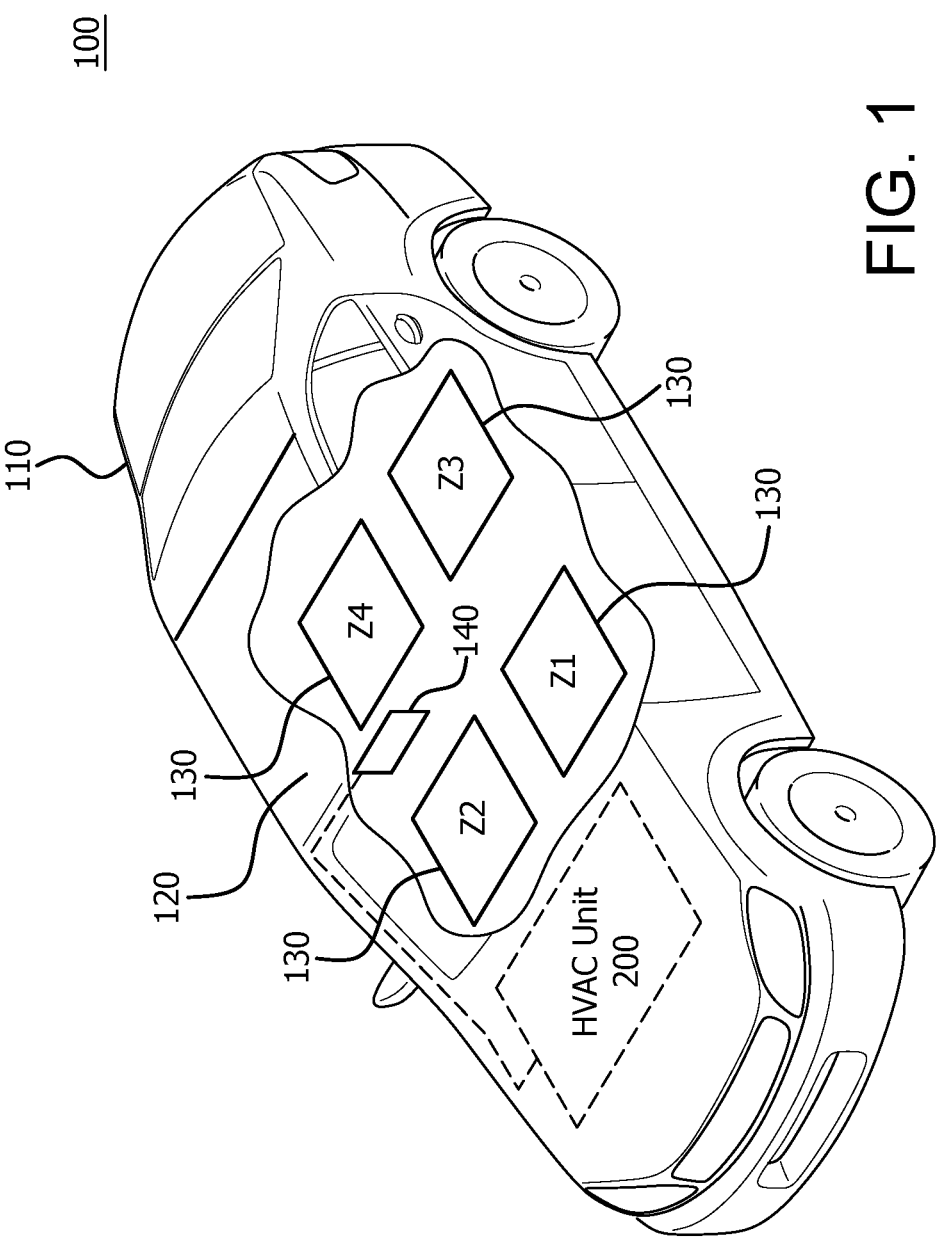
FIG. 1 is a diagram of an example vehicle including a heating, ventilating, and air conditioning (HVAC) unit.

FIG. 1 is a diagram of an example vehicle 100 including a heating, ventilating, and air conditioning (HVAC) system. The vehicle 100 includes a vehicle body 110, which includes a passenger cabin 120. Within the passenger cabin 120 exist one or more zones 130, (designated Z1 $130_1$, Z2 $130_2$, Z3 $130_3$, and Z4 $130_4$). Although 4 zones are depicted in the passenger cabin 120, it should be noted that more or less zones could exist in the passenger cabin 120, and include the ability to provide different climate conditions from one another if desired by an occupant in those zones. Additionally, a passenger detection device 140, (e.g., a facial recognition device), is included in the passenger cabin to recognize passengers that are in the various zones 130 of the vehicle. Although the passenger detection device 140 is shown disposed in the roof of the passenger cabin 120, it should be noted that the passenger detection device 140 may be located anywhere that would allow it to recognize all of the passengers in the vehicle. In addition, the passenger detection device 140 could include multiple components, (such as cameras), that recognize passengers in different zones and are connected to a central device. The passenger detection device, or devices, could include conventional facial recognition devices and associated components for determining which passenger is in which zone 130.

An HVAC unit 200, which will be described in further detail below, is included in the vehicle to provide the climate control for the passenger cabin 120, and provides adaptive climate control for each of zones Z1, Z2, Z3 and Z4 independent of one another. Although the HVAC unit 200 is depicted in a position behind where the instrument panel of the vehicle 110 would be, it should be understood that various components of the HVAC unit 200 would also exist throughout the passenger cabin 120 in order to provide heated or chilled air to each of the zones 130. For example, air vents may be included overhead, in the instrument panel, or in a console in the passenger cabin 120 within reach of an occupant to open or close to allow airflow to flow into the occupant's zone.

Figure 2:
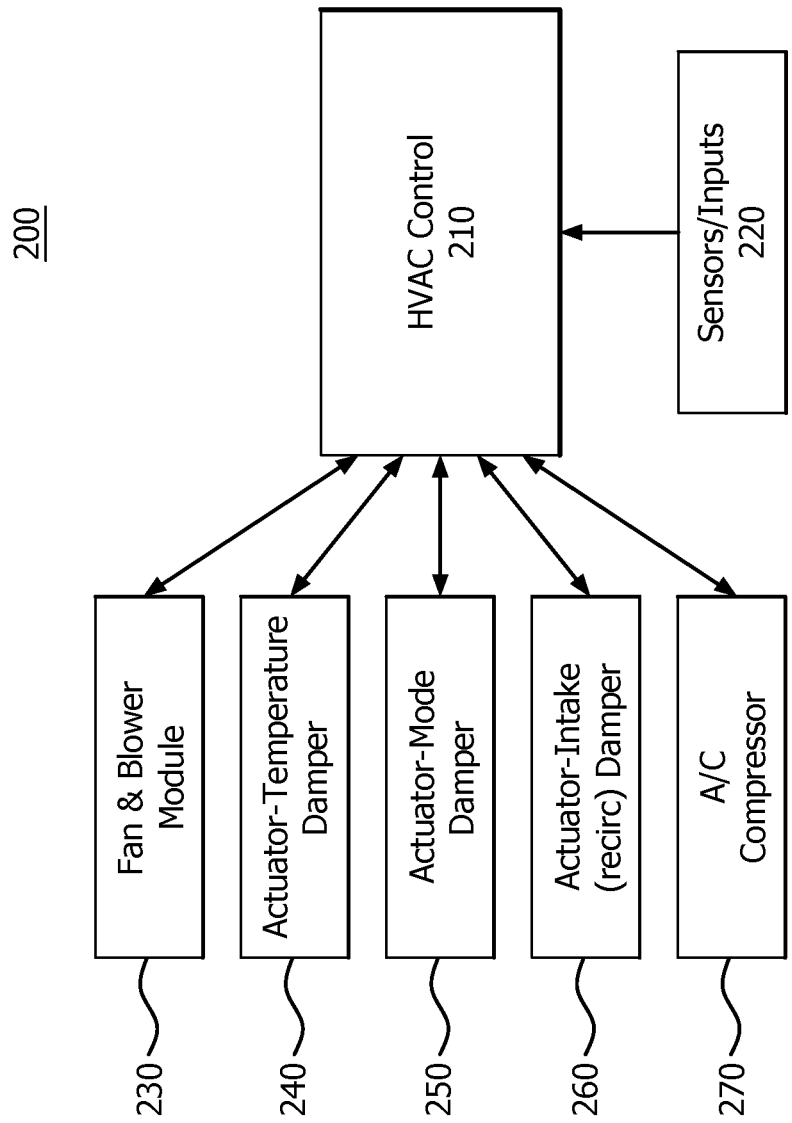
FIG. 2 is a block diagram of the example HVAC unit along with an associated control system.

FIG. 2 is a block diagram of the example HVAC unit 200 along with an associated control system. Although the various components of the HVAC unit 200 are described in further detail below, briefly it includes an HVAC control unit 210, sensors/inputs 220, (including a thermostat and power circuitry, among other things described in more detail below), a fan/blower module 230, actuator-temperature damper 240, actuator-mode damper 250, actuator-intake (recirculation) damper 260, and A/C compressor 270, and other hardware. It should be noted that other components known to one of ordinary skill in the art to operate a conventional HVAC unit are not depicted, but are understood to be included in HVAC unit 200. It should be noted that the passenger detection device 140 described above can be included as one of the inputs 220 to the HVAC control unit 210.

The HVAC control unit 210 controls the overall operation of the HVAC unit 200 by receiving inputs from one or more of the various components of the HVAC unit 200 and by outputting control signals to other components to cause them to operate in response to the control signals sent. For example, the sensors/inputs 220 may include sensors such as an evaporator temperature sensor, solar radiation sensor, humidity sensor, twilight sensor, in-car temperature sensors, ambient temperature sensors, refrigerant pressure sensor, and/or an A/C compressor solenoid sensor. The inputs may include biometric input devices/sensors, an input that provides the status of other thermal devices, (e.g., heated seats/steering wheel), a roof type (e.g. clear sunroof or opaque), a number of occupants detector/input, a global positioning (GPS) input, (e.g., with orientation information), or the like. The HVAC control unit 210 utilizes inputs from the sensors/inputs 220 in order control other components to provide adaptive climate control.

The HVAC control unit 210 uses the vehicle electrical bus as means of communicating to the other components of the HVAC unit 200, and receives power from the power circuitry, which may be the car battery or the vehicle 100 electrical power system (not shown). As mentioned above, the HVAC control unit controls passenger cabin 120 comfort by adjusting the various HVAC unit 200 components in response to user, environmental, and/or vehicle status inputs.

The HVAC control unit 210 can thereby automatically control the climate inside the passenger cabin 120 by utilizing the multiple in-vehicle sensors and inputs to provide input data about cabin conditions that can be responded to. For example, the HVAC control unit 210 can control the fan/blower module 230 to increase/decrease airflow, actuate the temperature damper 240, mode damper 250, intake damper 260, and/or A/C compressor 270 depending on the need to increase temperature or decrease temperature.

Figure 3:
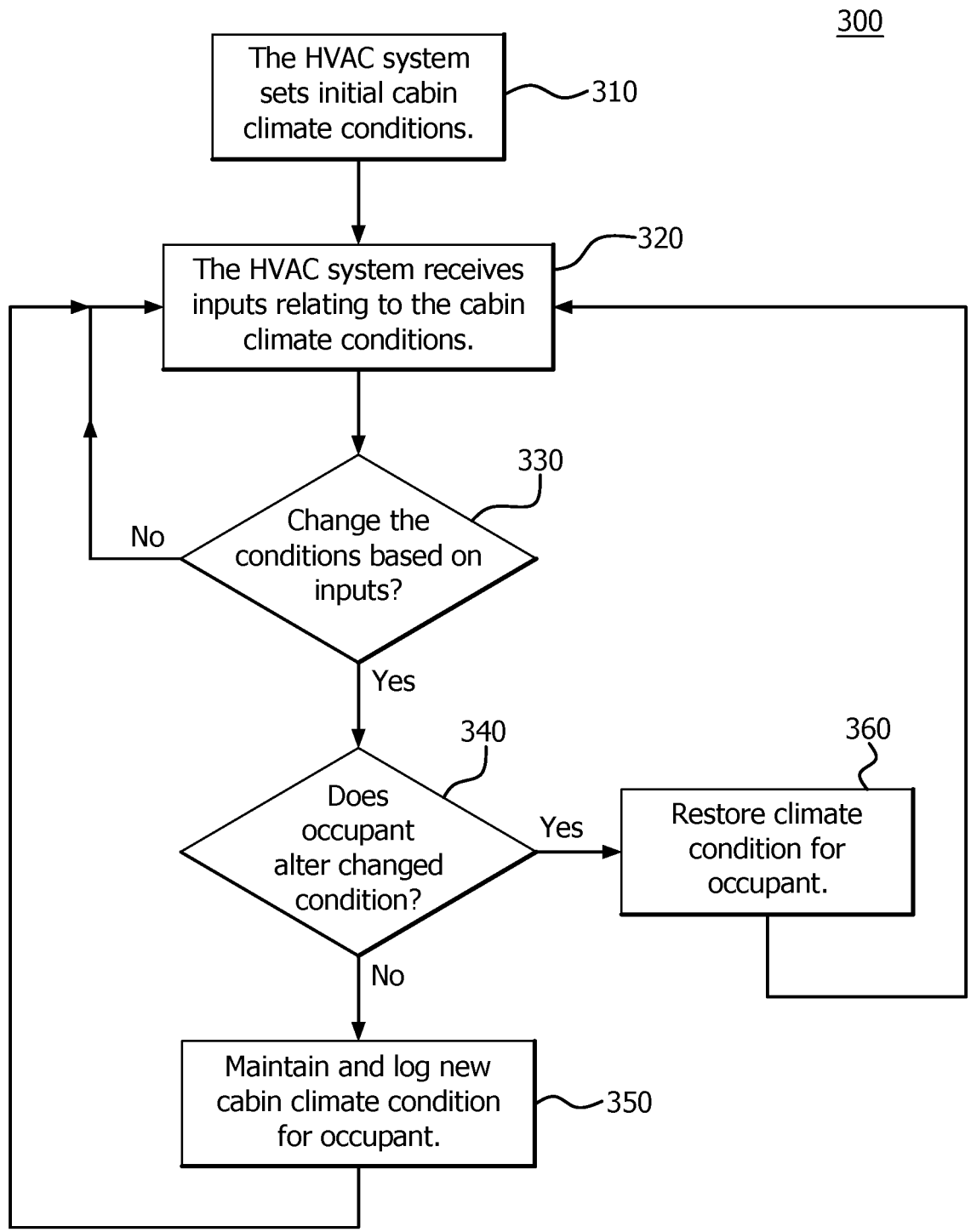
FIG. 3 is a flow diagram of an example method for providing adaptive HVAC control.

FIG. 3 is a flow diagram of an example method 300 for providing adaptive HVAC control. The method 300 provides a proactive, adaptive HVAC control method as opposed to a conventional method that reacts to environmental conditions to alter climate conditions. In step 310, the HVAC system, (e.g., HVAC unit 200), sets initial cabin climate conditions for the passenger cabin 120. This may be accomplished by utilizing a baseline comfort algorithm, with a first user of the vehicle 100 beginning to use the HVAC system. Additionally, the HVAC could be provided with data that describes what a typical occupant, (e.g., an occupant in a similar geographical region), prefers and utilize that as a baseline to set the initial climate conditions.

The method then proceeds to step 320, where the HVAC system receives the inputs, (e.g., from sensors/inputs 220), relating to the cabin climate conditions. In this step, the HVAC system may also attempt to learn the preferences of the various occupants of the passenger cabin 120, zone by zone. For example, referring back to FIG. 1, the passenger detection device 140, which in an example is an occupant facial recognition device, can be utilized where a sensor provides input to the HVAC system to let it know what occupant is residing in a particular zone. That is, the passenger detection device 140 examines the occupant in each zone to be stored by the HVAC control unit 210 for future use. The HVAC control unit 210 then receives input as to what climate conditions, (e.g., temperature, airflow, and the like), that particular occupant in that zone prefers. Effectively, this allows the HVAC control unit 210 to create a profile for that occupant to make future proactive determinations as to how to adjust the climate conditions for that occupant, no matter what zone 130 in the passenger cabin 120 he or she resides.

In addition, the HVAC system receives inputs such as those described above relating to the ambient conditions, GPS location/orientation, and temperature, for example. In such a manner, the control unit of the HVAC system, (e.g., HVAC control unit 210), receives multiple inputs as to what occupant is in a particular zone, what climate conditions that occupant prefers, and what other conditions exist that can assist in determining whether to adapt the climate conditions in the passenger cabin 120, or in a particular zone 130.

Accordingly, in step 330, the HVAC system determines whether to proactively change the climate conditions based upon the inputs. For example, if the HVAC system determines that the occupant in zone Z2 prefers a certain temperature and airflow, and receives input that the vehicle orientation is going to change, (e.g., from the GPS), placing zone Z2 into the sun, the HVAC control unit 210 may determine that the temperature in zone Z2 will rise, causing the preferred climate conditions for the occupant in zone Z2 to not be met. Therefore, the HVAC control unit 210 may provide signaling to the fan/blower module 230 and/or the dampers 240/250/260 for zone Z2 in order to proactively maintain the climate conditions that the HVAC system determines are preferred by the occupant of zone Z2. If it is determined that the conditions are not to be changed in step 330, then the method reverts to step 320, where the HVAC system continues to receive inputs for potential further action. Conventional HVAC systems are reactive in that they wait until the environmental condition changes, (e.g., the temperature rises), before making any climate change conditions.

Alternatively, since an occupant may not have experienced a certain environmental or thermal condition prior, the HVAC control unit 210 can predict how to adapt the HVAC system in step 330, (e.g., HVAC unit 200), based on comfort data from other users/occupants profiles, (e.g., profiles from those in similar geographic regions). For example, the HVAC system can be adapted for comfort based on other users within a geographic region that have experienced a similar condition and apply that comfort profile for the occupant.

If the climate conditions are proactively changed (step 330), then the HVAC system determines whether or not the occupant of the zone in which the conditions were changed alters them (step 340). That is, in the example above, in step 330, the HVAC control unit 210 may begin to proactively cool zone Z2 by having cooler air blown into it because it was determined that the temperature in that zone would rise momentarily. The occupant of zone Z2, though, may not prefer to have cooler air blowing on him/her, and therefore may actively lower the fan for that zone, raise the temperature, close the vent/damper or take some other action. In this case, the HVAC system detects that the occupant has altered the climate condition (step 340) that was changed in step 330, and restores the climate condition for the occupant (step 360). The method at that point reverts to step 320, where inputs go back to being monitored for further change.

Alternatively, if the HVAC system detects that the occupant does not alter the changed condition (step 340), then it maintains and logs the new cabin climate condition for that occupant (step 350). In this manner, the HVAC system learns the new climate condition for that occupant and can apply it for the occupant in the future no matter what zone the occupant resides. Again, the method reverts to step 320, where inputs continue to be monitored. In this manner, the HVAC system is able to continue to provide proactive climate condition changes in anticipation of the climate change due to the environmental inputs, as well as with a knowledge of a particular occupant in the zone's preferences, unlike conventional HVAC system, which merely react to the environmental conditions after the conditions have already changed, and do not proactively make climate condition changes, nor take into account a particular occupant's preferences.

Accordingly, in accordance with the example method above, the example HVAC unit 200 utilizes user inputted, biometric and other environmental data to learn how to make occupants comfortable. Once the HVAC control unit 210 sets an initial baseline comfort scenario, it monitors the usage of the climate control system of occupants and stores them, (e.g., in a memory of the HVAC control unit 210 not shown). The HVAC control unit 210 can then make proactive changes to the conditions in the zones $130_1$, $130_2$, $130_3$, and/or $130_4$ based on the occupants' usage of the HVAC system for those zones. Therefore, over a period of time the HVAC control 210 is able to adapt the climate conditions for each occupant, and make proactive climate condition changes.

As mentioned above, since in one example, occupant facial recognition can be utilized, (e.g., via passenger detection device 140), the HVAC control unit 210 adapts the climate conditions to each occupant without inquiring who is in the vehicle 100. The HVAC control unit may also receive as inputs additional data from occupants' biometric readings and clothing to create advanced adaptive climate control conditions. The biometric data can be generated from thermal imaging and/or feedback from wearable items, (e.g., an Apple® watch, FitBit®, or the like). Occupant detection can also receive visual or other input, (e.g., from the sensors/inputs 220), to determine the type of clothing worn by a particular occupant to adapt the climate conditions for the occupant for that clothing type, such as if the occupant is wearing a t-shirt as opposed to a heavy coat. Additionally, the HVAC control unit 210 can receive data from the sensors/inputs 220 that allow it to determine the thermal condition of the occupant, such is if the occupant just returned from working out a gym. With this data, the HVAC control unit 210 can make additional proactive decisions regarding changing the climate conditions for an occupant. For example, should the HVAC control unit 210 determine that an occupant is wearing a heavy coat, the HVAC control unit 210 may determine to be less aggressive with increasing temperature in that zone.

In the above manner, the HVAC system can determine, for example, if an owner of the vehicle is in the vehicle with their spouse and friend, as the HVAC control unit 210 could identify the occupants based on facial recognition or some other technique, and then apply their personally adapted climate conditions for each seating zone (e.g., Z1, Z2, Z3, and Z4). Furthermore, if the occupants switch seating positions, (i.e., switch zones), the personally adapted climate control conditions can be made to follow each occupant to his or her new seating position.

What is claimed is:

1. A method of proactive climate control in a vehicle heating, ventilation, air conditioning (HVAC) system, comprising:
    determining preferred climate conditions for an occupant of one or more zones in a vehicle passenger compartment;
    setting, automatically by a HVAC controller, a first HVAC system output producing an initial climate condition for the one or more zones in the vehicle passenger compartment based at least partially upon the preferred climate conditions for the occupant;
    monitoring one or more inputs;
    determining, based on the one or more inputs, that an orientation of the vehicle is going to change;
    determining, based on the first HVAC system output, that the change in the orientation of the vehicle is predicted to alter a temperature in at least one zone of the one or more zones to an altered temperature that falls outside of the preferred climate conditions for the occupant;
    changing, automatically by the HVAC controller in response to determining that the change in the orientation of the vehicle is predicted to alter the temperature in the at least one zone to the altered temperature, climate conditions for the at least one zone of the one or more zones based upon the predicted altered temperature, wherein changing the climate conditions comprises adjusting the first HVAC output to a second HVAC output that maintains the temperature in the at least one zone of the one or more zones within the preferred climate conditions for the occupant; and
    storing, by the HVAC controller, data relating to the changed climate conditions for the occupant.

2. The method of claim 1, wherein the initial climate condition for the one or more zones is determined utilizing a baseline algorithm.

3. The method of claim 2, wherein the baseline algorithm is determined by detecting a first user of the vehicle using the HVAC system.

4. The method of claim 2, wherein the baseline algorithm is determined by input settings of a user in a similar geographical area.

5. The method of claim 1, wherein the one or more inputs include any combination of the following inputs: an evaporator temperature sensor, a solar radiation sensor, a humidity sensor, a twilight sensor, an in-car temperature sensor, an ambient temperature sensor, a refrigerant pressure sensor, an air conditioning (A/C) compressor solenoid sensor, a biometric sensor, a thermal device status sensor, a roof type sensor, a number of occupants detector, or a global positioning (GPS) input.

6. The method of claim 1, further comprising:
    determining, after changing the climate conditions, that the occupant altered the changed climate conditions; and
    restoring, automatically by the HVAC controller, the first HVAC system output.

7. The method of claim 5, wherein determining that the orientation of the vehicle is going to change is based on information received as part of a global positioning (GPS) input.

8. The method of claim 1, wherein the initial climate condition for the one or more zones is based at least partially on a thermal condition of the occupant, and wherein the thermal condition of the occupant is received from a wearable item of the occupant.

9. The method of claim 8, further comprising monitoring for an occupant-initiated change by the occupant of the at least one zone of the one or more zones to an output of the HVAC system where the temperature has been increased or decreased.

10. The method of claim 9, wherein upon a determination that the occupant has effected the occupant-initiated change to the output of the HVAC system, storing information about the occupant-initiated change and using the stored information about the occupant-initiated change for a subsequent climate condition change operation.

11. A proactive heating, ventilation, and air conditioning (HVAC) system for a vehicle, comprising:
    an HVAC control unit;
    one or more sensors in communication with the HVAC control unit; and
    one or more of the following components in communication with the HVAC control unit: a fan and blower module, an actuator-temperature damper, an actuator-mode damper, an actuator-intake damper, and an AC compressor, wherein
    the HVAC control unit determines preferred climate conditions for an occupant of one or more zones in a vehicle passenger compartment; sets, automatically, a first HVAC system output that produces an initial climate condition for the one or more zones in the vehicle passenger compartment based at least partially upon the preferred climate conditions for the occupant; monitors one or more inputs via the one or more sensors; determines based on the one or more inputs, that an orientation of the vehicle is going to change; determines, based on the first HVAC system output, that the change in the orientation of the vehicle is predicted to alter a temperature in at least one zone of the one or more zones to an altered temperature that falls outside of the preferred climate conditions for the occupant; changes, automatically in response to determining that the change in the orientation of the vehicle is predicted to alter the temperature in the at least one zone to the altered temperature, climate conditions for the at least one zone of the one or more zones based upon the predicted altered temperature, wherein changing the climate conditions comprises adjusting the first HVAC output to a second HVAC output that maintains the temperature in the at least one zone of the one or more zones within the preferred climate conditions for the occupant; and stores data relating to the changed climate conditions for the occupant.

12. The system of claim 11, further comprising a power circuit connected to the HVAC control unit.

13. The system of claim 11, wherein the one or more sensors include any combination of the following sensors: an evaporator temperature sensor, a solar radiation sensor, a humidity sensor, a twilight sensor, an in-car temperature sensor, an ambient temperature sensor, a refrigerant pressure sensor, an air conditioning (A/C) compressor solenoid sensor, a biometric sensor, a thermal device status sensor, a roof type sensor, a number of occupants detector, or a global positioning (GPS) input.

14. The system of claim 13, wherein a roof type is clear or opaque.

15. The system of claim 13, wherein the GPS input includes vehicle orientation information.

16. The system of claim 11, wherein the initial climate condition for the one or more zones is determined utilizing a baseline algorithm.

17. The system of claim 16, wherein the baseline algorithm is determined by detecting use of a first user of the vehicle.

18. The system of claim 17, wherein the baseline algorithm is determined by input settings of a user in a similar geographical area.

19. The system of claim 11, wherein the initial climate condition for the one or more zones is based at least partially on a thermal condition of the occupant, and wherein the thermal condition of the occupant is received from a wearable item of the occupant.

20. The system of claim 19, further comprising the HVAC control unit monitoring for an occupant-initiated change by the occupant of the at least one zone of the one or more zones to an output of the HVAC system where the temperature has been increased or decreased, and upon a determination that the occupant has effected the occupant-initiated change to the output of the HVAC system, stores information about the occupant-initiated change and uses the stored information about the occupant-initiated change for a subsequent climate condition change operation.

* * * * *